United States Patent

Galleithner et al.

[11] 3,864,189
[45] Feb. 4, 1975

[54] BUILDING OF PNEUMATIC TIRE ASSEMBLIES

[75] Inventors: Hans Galleithner, Baden; Kurt Strauch, Wien, both of Austria

[73] Assignee: Semperit Aktiengesellschaft, Vienna, Austria

[22] Filed: Feb. 22, 1972

[21] Appl. No.: 227,787

[30] Foreign Application Priority Data
Feb. 22, 1971   Austria ............................... 1473/71

[52] U.S. Cl. ............... 156/415, 156/128 I, 156/416
[51] Int. Cl. ............................................ B29h 17/16
[58] Field of Search ........... 156/128, 414, 415, 416, 156/123

[56] References Cited
UNITED STATES PATENTS

| | | | |
|---|---|---|---|
| 1,474,149 | 11/1923 | Hopkinson et al. | 156/123 X |
| 1,777,405 | 10/1930 | Frank | 156/416 |
| 1,875,390 | 9/1932 | Musselman | 156/123 X |
| 3,111,443 | 11/1963 | Vanzo et al. | 156/416 X |
| 3,111,444 | 11/1963 | Pouilloux | 156/416 |
| 3,278,362 | 10/1966 | Johannes | 156/415 |
| 3,373,066 | 3/1968 | Hindin | 156/128 |
| 3,380,872 | 4/1968 | Pouilloux | 156/416 |
| 3,508,988 | 4/1970 | Waller | 156/416 X |

FOREIGN PATENTS OR APPLICATIONS

| | | | |
|---|---|---|---|
| 1,088,866 | 10/1967 | Great Britain | 156/416 |
| 1,000,262 | 8/1965 | Great Britain | 156/416 |

*Primary Examiner*—Clifton B. Cosby
*Attorney, Agent, or Firm*—Ernest F. Marmorek

[57] ABSTRACT

A method of building a pneumatic tire assembly is described in which a partial assembly comprising the bead cores and carcass is built on a building drum using the known flat drum procedure; the partial assembly is then given the required profile solely by means of a pressurized fluid, the supporting surface of the drum being drawn inwardly as the tire beads are drawn towards one another; and the remainder of the tire assembly is then built up. Various forms of building drum for use in this method are also described.

12 Claims, 10 Drawing Figures

BUILDING OF PNEUMATIC TIRE ASSEMBLIES

BACKGROUND OF THE INVENTION

The present invention relates to a method of building pneumatic tire assemblies, in particular radial tire assemblies, and to a building drum for use in carrying out the method.

It is well known to build radial tire assemblies in a so-called two-stage process. In a first stage, a partially build tire assembly is produced using the known flat drum technique. Thereafter, this partially built assembly consisting essentially of the bead cores and the carcass of the tire, is removed from the flat drum winding machine and given the requisite cross-sectional form by a separate device, whereafter the remaining layers, for example the girdle and the tread, are applied. This method has the disadvantage that, in particular because of need to transfer the partially built assembly, disuniformites occur which have a highly undesirable effect upon the ride qualities of the finished tire. For this reason, it has already been proposed to build the entire tire assembly on a single device. Devices of this kind may consist, for example, of a drum which is made up of two mutually parallel, coaxial discs between which a flexible sleeve is fixed. When the discs are moved apart, the sleeve takes up a generally cylindrical shape and is supported internally by special supporting elements. The carcass layers and the bead cores are then built on the cylindrical sleeve whereafter, whilst moving the discs together again, the sleeve is given a curved section by the introduction of a pressurised medium; the remaining layers are then built on top of the partially built tire assembly carried on the sleeve. Such a device has the disadvantage that the flexible sleeve, whose extension cannot be uniform at all sections, radically affects the carcass extension so that during the building operation a whole series of undesired stresses are produced in the tire assembly, and these have a very unfavourable effect upon the ride qualities of the finished tire.

SUMMARY OF THE INVENTION

It is an object of the present invention, to provide a method of building a tire assembly which does not suffer from the disadvantages referred to above.

According to the invention, there is provided a method of building a pneumatic tire assembly comprising the steps of building, in a first stage, a partial tire assembly consisting essentially of the bead cores and the carcass, in conventional manner on a building drum adapted for the carrying out of the known flat drum procedure, thereafter, in a second stage, moving the bead cores towards one another and simultaneously giving the partial assembly the requisite profile on the same building drum using only a liquid or gaseous pressurised medium, and thereafter building up the remainder of the elements of the tire assembly on said partial assembly.

In the method of the invention, a flexible sleeve is not used to produce the required curved profile in the partially built assembly, so that the operation of the producing this profile is substantially more uniform. In order to prevent any disturbance occuring during the profile-forming operation it is convenient if the cylindrical peripheral surface of the building drum, which surface is required for the flat drum technique of the first stage, is drawn inwardly towards the drum axis during the second stage of the operation.

PREFERRED EMBODIMENTS OF THE INVENTION

The method of the invention can be carried out using a building drum having two mutually parallel, coaxial discs movable axially in relation to one another, between the circumferences of which a flexible element of cylindrical form is provided, this element being in the form of a flexible sleeve or covering having at least one aperature therein. The discs may, if desired, also be capable of circumferential rotation with respect to one another. Through the aperture or apertures, the pressurised medium passes through the sleeve or covering during the profile-forming stage, and acts directly upon the tire assembly. The sleeve or covering does not therefore itself actually participate in the profile-forming operation. In order, on the one hand, to take account of the differences in rolling pressures occuring during the flat drum building stage, and on the other hand, to cause the sleeve to sag inwardly towards the axis at specific points, it is convenient if the sleeve is provided with a plurality of apertures the distribution of which varies in the axial direction. This effect can also be achieved if the element is a sleeve which has a wall thickness that varies in the longitudinal direction. The element may also be constituted by a sleeve of elastomeric material possibly provided, at least in part, with reinforcing inserts. These reinforcing inserts may, for example, consist, at least in part, of rigid bodies.

In order to prevent the tire assembly from adhering to the flexible element, in particular when using an apertured sleeve, it is convenient to provide the sleeve with an outer layer which will prevent such adhesion.

Instead of a flexible sleeve, the element can also be a covering consisting of yarn or wire. The covering can consist of yarns extending substantially parallel to the drum axis but it may also be in the form of a woven fabric, in which case the yarns running transversely of the longitudinal yarns can be elastic. The result of this will be that when the discs are moved towards one another, the covering will be drawn inwards towards the drum axis by the elastic yarns. The longitudinal yarns of the covering material, however, should be essentially non-elastic in nature, so that the layers applied in the flat drum stage have an adequately solid support.

It is convenient, moreover, if the axial dimensions of the element can be adjusted. In this way, tire assemblies of different widths can be build on one and the same drum. This kind of adjustability can be provided, for example, by arranging for the yarns of the covering, or the flexible sleeve, to be drawn more or less tightly into one of the discs.

In addition, a constricting means, consisting of a number of spring elements, e.g. tension springs or rubber bands, can be provided, these engaging with the inside of the element. This ensures that the element, whether in the form of a sleeve or a covering, reliably detaches itself from the tire assembly during the profileforming stage.

BRIEF DESCRIPTION OF THE DRAWING:

The invention will now be further described with reference to the drawings, in which.

Figure 1:
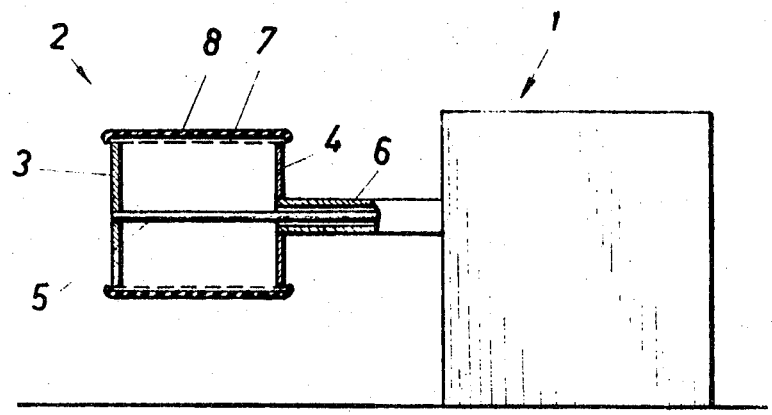
FIG. 1 to 3 are three similar schematic side views partly in section, of a tire building machine, to illustrate three successive stages in a method according to the invention.

DESCRIPTION OF ILLUSTRATED EMBODIMENT:

Referring to FIG. 1, a tire building machine 1 is provided with a drum 2 which consists of two mutually parallel, coxial discs 3 and 4 movable axially with respect to one another, the disc 3 being carried on a shaft 5 and the disc 4 on a hollow shaft 6 surrounding and coxial with the shaft 5. Between the peripheries of the discs 3 and 4, a flexible element 7 having a cylindrical form is provided. In the first stage of the building operation, the two discs 3 and 4 are moved axially apart until the element 7 is taut. Then, a partial tire assembly 8 is built on the element, consisting essentially of the carcass layers, the bead cores and flaps the inner liner and so on.

Figure 2:
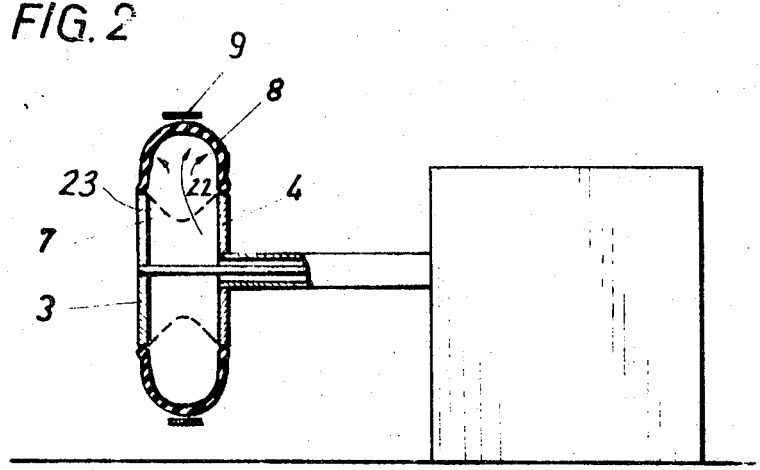

In FIG. 2 the second stage is illustrated, during which the discs 3 and 4 are moved axially toward one another, whilst at the same time, the partial tire assembly 8 is given to the required profile shape by the introduction of a liquid or gaseous pressurised medium 22. The element 7 is provided with apertures 23 through which the pressurised medium passes to act directly on the interior of the partial tire assembly 8. After the completion of the frofile-forming operation, the remaining layers 9 are applied to the profiled partial tire assembly 8.

Figure 3:
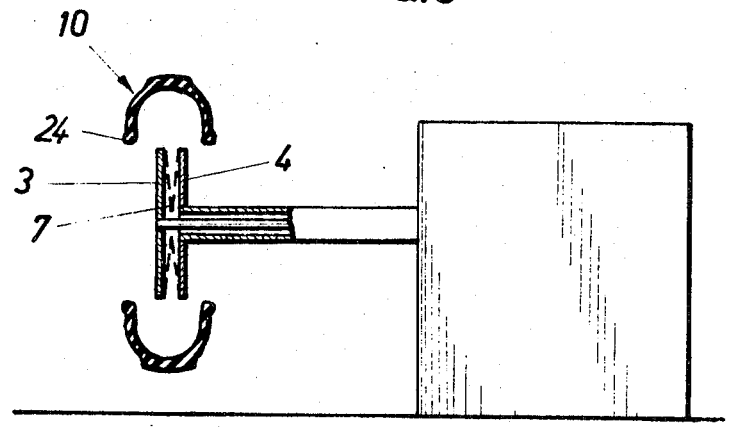

FIG. 3 illustrates the operating stage during which the completed tire assembly 10 is removed from the device. For this purpose, the discs 3 and 4 are moved towards one another into a final position and the beads 24 of the tire assembly 10 released from the discs 3 and 4; the tire assembly can now easely be removed. If any difficulty should be experienced during this releasing operation then the discs 3 and 4 can also be rotated circumferentially relative to one another. The tire can then easily be removed downwardly from the discs 3 and 4 when the latter are in this position (moved together).

Figure 4:
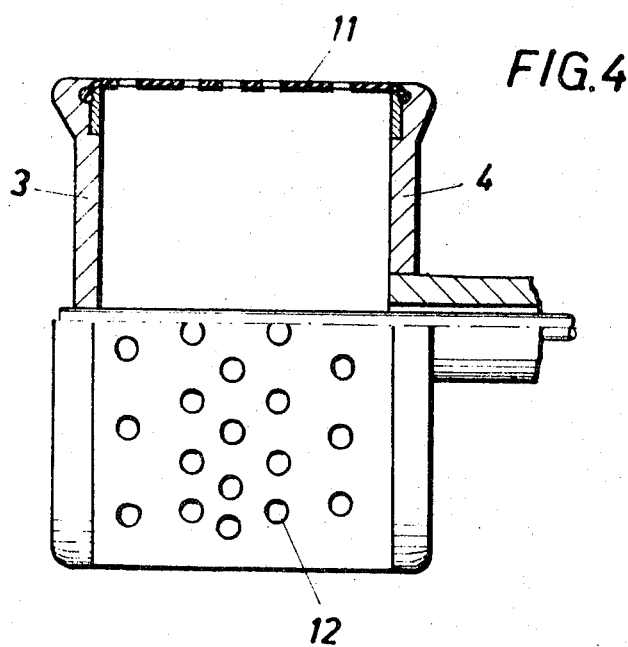
FIG. 4 is a side view, partly in section of one form of building drum according to the invention.

FIG. 4 illustrates a building drum in which a flexible sleeve 11 is fitted between the discs 3 and 4 and contains a plurality of apertures 12. These aperatures occur more frequently on the central zone of the sleeve 11. Consequently, the sleeve has a higher elasticity in this zone and will therefore be constricted at this point.

Figure 5:
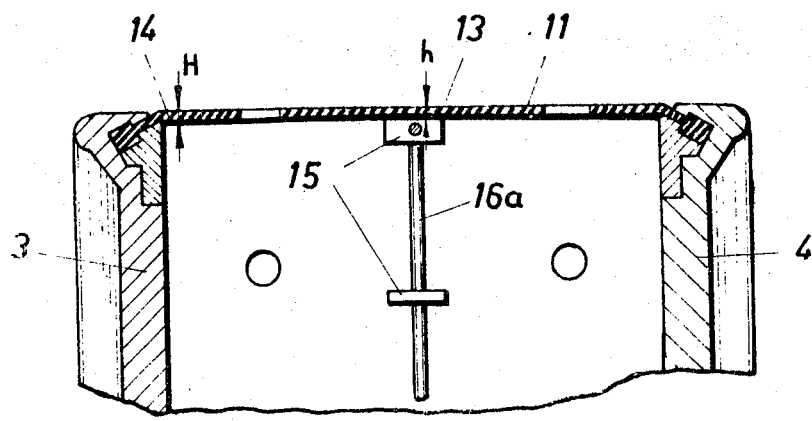
FIG. 5 to 8 are respectively similar partial side sectional views of four further forms of building drum according to the invention.

In the embodiment of building drum shown in FIG. 5, a sleeve 11 has a smaller thickness $h$ at its central zone 13 than at its edge zones 14 immediately adjacent the discs 3 and 4 where the thickness reaches its maximum $H$. In order to ensure that the sleeve 11 is drawn towards the axis in the zone 13, it is provided with a number of annular elements 15 through which a preloaded spring element 16a, e.g. a rubber band, is threaded.

Figure 6:
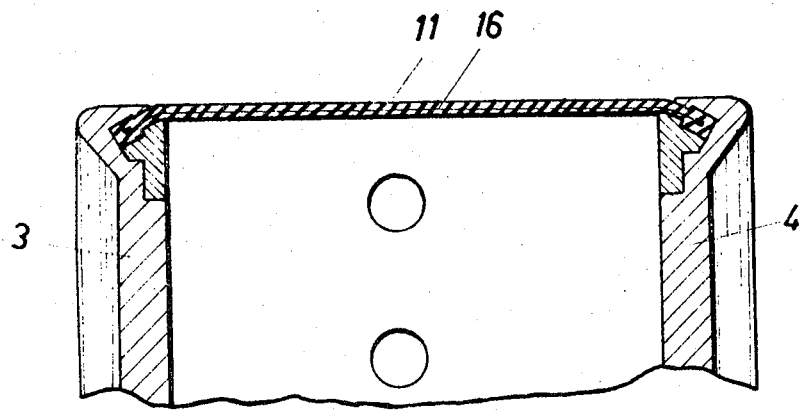
Figure 7:
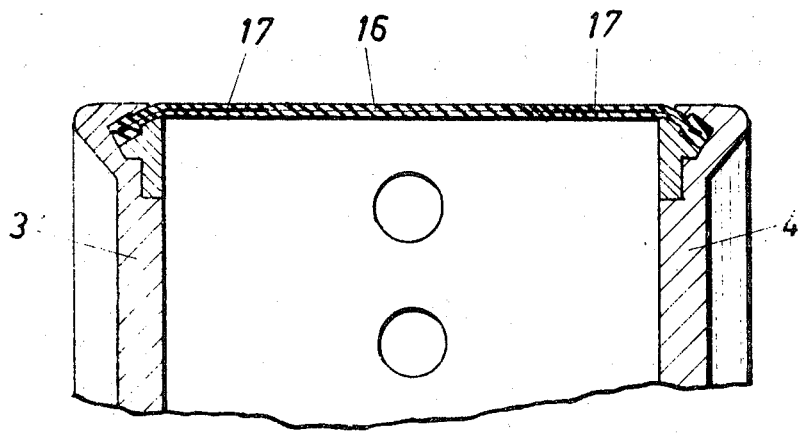

FIG. 6 illustrates an embodiment of building drum in which a sleeve 11 is equipped with a reinforcing insert 16. This insert 16 can (as shown in FIG.7) also possess non-elastic elements 17.

Figure 8:
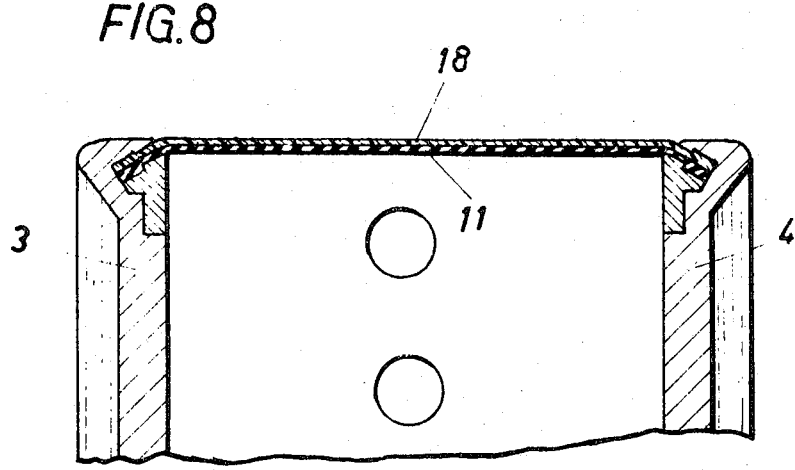

In order to prevent the pneumatic tire assembly from adhering to the sleeve, in the embodiment of FIG. 8 the sleeve 11 is provided with an external layer 18 adapted to prevent such adhesion. Because the bonding of the sleeve to a non-adhesive external layer often creates problems, it is possible instead to make the entire sleeve of non-adhesive material.

Figure 9:
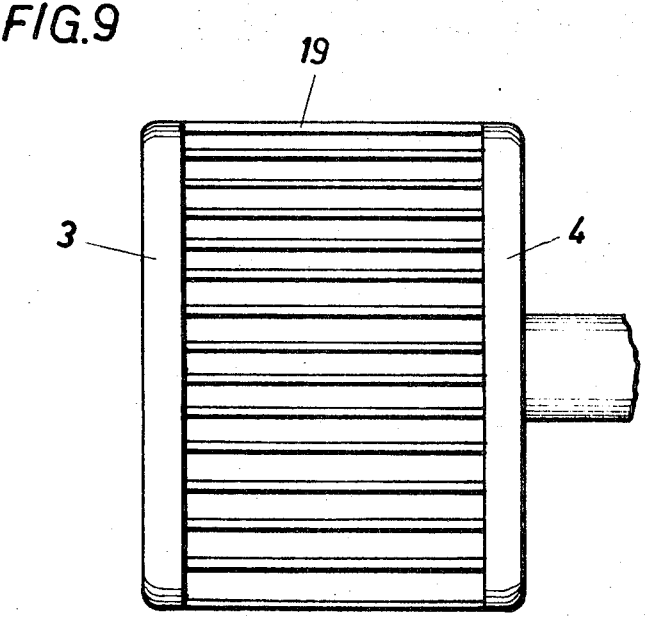
FIG. 9 is a side view of a fifth form of building drum according to the invention.

In the embodiment of FIG. 9, a covering 19 is provided between the two discs 3 and 4, which covering consists of a plurality of substantially parallel yarns of wires. These yarns or wires can for example be sheathed stranded wires which have particular elasticity.

Figure 10:
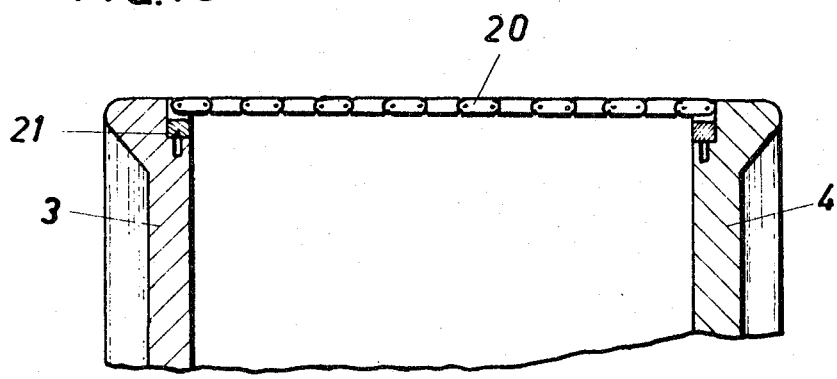
FIG. 10 is a partial side sectional view of a sixth form of building drum according to the invention.

In addition, essentially non-elastic wires can be interwoven with elastic transverse yarns which, when the discs 3 and 4 are moved together, cause the wires to constrict inwardly. The yarns or the sleeve in accordance with the above-described embodiments, can be adjustably secured in one disc, i.e., can be drawn into the disc to a greater or lesser extent. In this way tire assemblies of different width and the same bead diameter can be built on a single device. The same also applies to the embodiment of FIG. 10 in which, instead of the yarns 19, chains 20 are held between the discs 3 and 4. In order in this embodiment, to be able to move the disce circumferentially in relation to one another, the ends of the chains 20 are secured to pins 21 which enable the chains to execute a certain angular movement in whe peripheral direction.

Having thus described our invention, what we claim is:

1. A building drum for fabricating a radial belted, pneumatic tire assembly comprising the combination of two parallel discs which are adapted to be moved coaxially with respect to one another, a flexible, fluid permeable support element mounted on said discs to define an annular chamber for receiving thereon a partial tire assembly including bead cores and a carcass, means for supplying a pressurized fluid to the interior of said annular chamber and means for deflecting said support element radially inward, whereby the partial tire assembly is deflected radially outward when the pressurized fluid passes through said support element to thereby act directly on the interior surface of the partial tire assembly and further including means comprising a plurality of retaining members secured to the interior surface of said support element and at least one prestressed, annular spring member threaded through said retaining members.

2. The building drum as claimed in claim 1 wherein said support element is a sleeve having a smaller thickness at its central zone than at its edge zones immediately adjacent said discs.

3. A building drum as claimed in claim 1, wherein said support element is a flexible sleeve having a plurality of apertures therein, the distribution of which varies in the axial direction.

4. A Building drum as claimed in claim 1, wherein said support element is a flexible sleeve having a wall thickness which varies in the axial direction.

5. A building drum as claimed in claim 1, wherein said support element is flexible sleeve of elastomeric material.

6. A building drum as claimed in claim 5, wherein said flexible sleeve is provided at least in part with at least one reinforcing insert.

7. A building drum as claimed in claim 6, wherein said flexible sleeve is provided with at least one reinforcing insert in the form of a rigid body.

8. A building drum as claimed in claim 1, wherein said support element is in the form of a flexible sleeve having an external layer adapted to prevent the adhesion of a tire assembly to the sleeve during use.

9. A building drum as claimed in claim 1, wherein said support element is constituted by a covering of material formed of yarn or wire.

10. A building drum as claimed in claim 9, wherein the material of said covering is essentially non-elastic.

11. A building drum as claimed in claim 1, wherein said support element is constituted by a covering in the form of a plurality of chains.

12. A building drum as claimed in claim 1, wherein the axial dimension of said support element is adjustable.

* * * * *